Patented Feb. 19, 1935

1,991,687

UNITED STATES PATENT OFFICE

1,991,687

VAT DYESTUFF AND INTERMEDIATE OF THE PYRENE-QUINONE AND PERYLENE-QUINONE SERIES

Ralph N. Lulek and Melvin A. Perkins, Milwaukee, Wis., assignors to E. I. du Pont de Nemours & Company, Wilmington, Del., a corporation of Delaware No Drawing. Application April 10, 1933, Serial No. 665,441

20 Claims. (Cl. 260—61)

This invention relates to vat dyestuffs and intermediates therefor.

It is an object of this invention to prepare novel compounds of the pyrene-quinone and perylene-quinone series, some of which are useful as vat dyestuffs, while the others may be used as intermediates for the manufacture of other organic compounds.

It is a further object of this invention to provide novel intermediates for the production of the compounds aforementioned.

It is a further object of this invention to provide processes for the manufacture of said novel intermediates and for conversion of the latter into compounds of the pyrene and perylene series.

Other and further important objects of this invention will appear as the description proceeds.

The novel compounds of this invention are derivable by ring closure from α-aroyl-anthracenes, and are characterized by possessing in their structure the configuration:

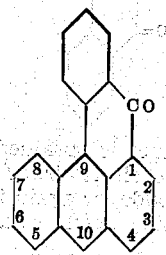

This series includes the ring-closed derivative obtained from α-mono-aroyl-anthracene, as well as the compounds obtainable by ring closing x, α-diaroyl-anthracenes, wherein x stands for another α-position or for a meso position. These diaroyl derivatives have the general formula:

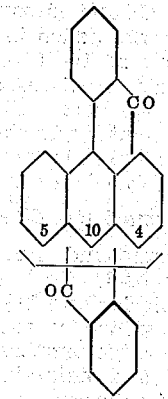

and include in their structure either the pyrene-quinone or the perylene-quinone configuration. More particularly, the 1,4-diaroyl derivative leads to a compound of the pyrene-quinone structure; the 1,5-isomer to a perylene-quinone; while the 1,10-derivative may lead to either a pyrene-quinone or a perylene-quinone, and most likely to a mixture of the two.

The ring closure, according to our invention, may be effected by fusion with a metal halide condensing agent such as aluminum chloride, preferably in the presence of oxidizing agents.

Most of the intermediates requisite for our process are, to the best of our knowledge, also novel compounds and form an integral part of this invention. We prepare these novel compounds by starting with the corresponding alpha-anthracene-mono- or di-carboxylic acid, converting the same into the corresponding mono- or di-carbonyl-chloride, and then reacting with an aromatic hydrocarbon in the presence of a metallic halide condensing agent. In the case of the 1,10-diaroyl-anthracene, the 1-aroyl-anthracene is prepared first as mentioned above, and then reacted with benzoyl chloride in the presence of aluminum chloride.

Without limiting our invention to any particular procedure, the following examples are given to illustrate our specific mode of operation. Parts are by weight.

EXAMPLE 1

(a) Formation of acid chloride 15 parts of 1,4-anthracene-dicarboxylic acid, obtained from the corresponding anthraquinone-dicarboxylic acid by reduction with zinc and ammonia (Elbs. Journal für Praktische Chemie (2), 41, 30, and Phillips, Journal of the American Chemical Society, 46, 2533), are introduced into 45 parts of water-free benzol at room temperature. 25 parts of phosphorus pentachloride are now added and the mixture is agitated until nearly all is in solution. Heat is then applied gently and the solution is heated to reflux for about 15 minutes or until hydrochloric acid evolution has ceased. The dark reddish solution is then allowed to cool slowly, separating deep red crystals. Agitation is then applied and 70 parts of petroleum ether are added. The red crystals are filtered by suction, washed with petroleum ether (90 parts) and dried. The yield is good and the deep red crystalline product analyzes about 23% chlorine. (Theory for 1,4-anthracene-dicarboxylic acid chloride=23.4% Cl.)

(b) Formation of ketone 10 parts of the product of Step (a) are introduced into 100 parts of water-free benzol, and 25 parts of aluminum chloride are added in small portions at 20–25° C. over the course of one-half hour. The acid chloride goes rapidly into solution and the solution becomes dark. The solution is warmed to 50° C. over the course of one hour and maintained at 50–60° C. for three hours. At the end of this period, the mixture is allowed to cool and then poured onto ice (about 500 parts) to which hydrochloric acid (35 parts of sp. gr. 1.10 acid) has been added. The excess benzol is steamed off, and the mass is allowed to cool. A brownish-yellow solid mass is obtained, which is ground up and agitated first with dilute hydrochloric acid, and then with dilute ammonia; and finally it is dried in the air. The product is most probably 1,4-dibenzoyl-anthracene. It is a light brownish-yellow solid giving an orange coloration in sulfuric acid, and being very soluble in the common organic solvents.

(c) Ring closure 10 parts of the diketone obtained in Step (b) are stirred into 100 parts of molten anhydrous sodium-aluminum chloride at 160° C., and the melt is maintained at this temperature with stirring and introduction of a slow stream of oxygen for a period of 24 hours. The melt is then hydrolyzed by pouring onto ice, containing hydrochloric acid, and the mass heated, filtered, and the brown residue washed free of acid. The product forms a brown powder which is not soluble in alkaline hydrosulfite solution. It is most probably a pyrene-quinone derivative of the formula:

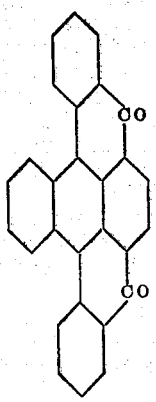

Example 2

(a) Formation of acid chloride 10 parts of 1,5-anthracene-dicarboxylic acid (pale, greenish-yellow solid made by reduction of 1,5-anthraquinone-dicarboxylic acid by means of zinc and ammonia—Scholl, Berichte, 62, 109) are suspended in 50 parts of water-free benzol and 16.5 parts of phosphorus pentachloride are added. The reaction is allowed to proceed without external application of heat for one hour, after which heat is applied gently. The solid gradually goes into solution. Heating is continued until the solution has refluxed for about one-half hour or until hydrochloric acid evolution ceases. Upon cooling, greenish-yellow crystals appear. The mass is diluted with an equal volume of petroleum ether, filtered, and the 1,5-anthracene-dicarboxylic acid chloride washed with petroleum ether and dried. It forms a dull green-yellow powder and contains a quantity of chlorine corresponding to two atoms.

(b) Formation of ketone

The product of Step (a) is converted into the 1,5-anthracene-diphenyl-ketone by the procedure of Example 1 (b). The diketone thus obtained forms a brownish-orange powder and gives an intense grass-green coloration in sulfuric acid. A similar product is obtained by using toluol in place of benzol in this example.

(c) Ring closure

An intimate mixture, made by grinding together 10 parts of the product of Step (b), 10 parts of manganese dioxide and 100 parts of anhydrous aluminum chloride, is fused and heated at 160–170° C. for about three hours. Copious evolution of hydrochloric acid takes place. The melt is then hydrolyzed as usual for this type of reaction (see Example 1 (c)), excess manganese dioxide is destroyed by treatment with sulfur dioxide, and the violet solid remaining is filtered off, washed and dried. It forms a dense coppery blue solid which dissolves in concentrated sulfuric acid with a grass green color and in alkaline hydrosulfite with a bluish-green color. Cotton is dyed in reddish-violet shades of good fastness. The dyestuff is probably a dibenz-perylene-quinone of the formula:

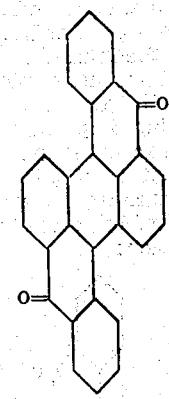

The same product is obtained by using other oxidizing agents, such as air, or oxygen, in place of manganese dioxide, or again in the absence of any added oxidizing agent whatever.

Example 3

(a) Formation of acid chloride and monoketone 10 parts of alpha-anthracene-carboxylic acid are suspended in 100 parts of benzol, and 9 parts of phosphorus penta-chloride are added. The mass is warmed gradually, boiled for one-half hour, cooled to 15° C., and 15 parts of anhydrous aluminum chloride are added in small portions. After one-half hour at 15–20° C. the temperature is gradually raised to 50° C. and maintained at that value for one hour. The mass is then cooled, drowned in dilute hydrochloric acid, steam distilled and worked up as in Example 1. It constitutes most probably 1-benzoyl-anthracene.

(b) Formation of diketone 1 part of this compound is next suspended in 10 parts of nitrobenzol. To this suspension, ¾ part of benzoyl chloride and 1½ parts of aluminum chloride are added at room temperature. After one-half hour, the temperature is gradually raised to 60° C. and maintained at this value for two hours. After drowning in dilute hydrochloric acid, the nitrobenzoyl is steamed off and the residue is extracted with alcohol. It consists, most probably, of 1,10-dibenzoyl-anthracene.

The same compound may also be obtained by benzoylating alpha-anthracene-carboxylic acid in nitrobenzene and converting the benzoyl-anthracene-carboxylic acid thus obtained to the dibenzoyl-anthracene through the acid chloride and condensation of the latter with benzol in accordance with procedures already described.

(c) *Ring closure*

1 part of the product of Step (b) (either method) is intimately mixed with 5 to 7 parts of sodium aluminum chloride, and the mixture is fused at 160–180° C. for about 10 hours. Oxidizing agents may be added if desired. After 10 hours, the melt is drowned and worked up in the usual manner. The new ketonic hydrocarbon is not soluble in alkaline hydrosulfite solution but is different from the starting material. It is most probably a mixture of two compounds represented by the following formulas:

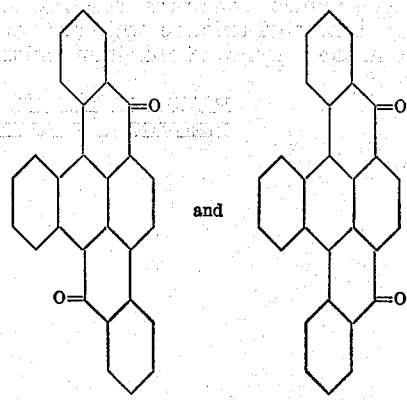

It will be understood that many variations and modifications are possible in the specific procedures above set forth without departing from the spirit of this invention.

For instance, the formation of the anthracene acid chlorides may be modified according to any well known procedure for preparing acid chlorides from the corresponding carboxylic acids. Thus, instead of benzol, phosphorus oxy-chloride may be used as solvent. Or the solvent may be omitted altogether, the reactants being merely fused together. Instead of phosphorus pentachloride, thionyl chloride may be used as chlorinating agent.

Again, after formation of the anthracene acid chlorides, the latter may be isolated as described and further treated with benzol and aluminum chloride to form the corresponding anthracene-phenyl-ketone, or aluminum chloride may be added directly to the mass in which the acid chloride was formed, causing the latter to react with the benzol which had been employed heretofore as solvent.

Instead of benzol, toluol, naphthalene or other cyclic aryl compounds may be used to form the corresponding anthracene aryl-mono-ketone or di-ketone.

In the aluminum chloride fusion the time and temperature may be varied within wide limits, as will be understood from analogous fusions known in the art. Sodium chloride may be added to reduce the fusion point of the mass. Oxidizing agents such as manganese dioxide or potassium chlorate may be added to facilitate ring closure, or a stream of oxygen or air may be conducted through the molten mass. Or again, the oxidizing agent may be omitted altogether, the contact of the fused mass with the atmosphere being sufficient to effect the requisite degree of oxidation.

We claim:

1. A compound of the general formula:

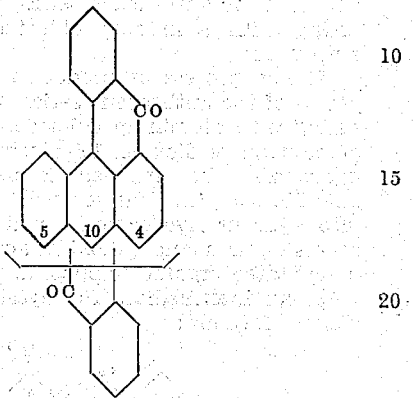

said compound being substantially identical with the compound obtainable by ring closing by the aid of aluminum chloride in the presence of an oxidizing agent an $x$ 1-diaroyl-anthracene where $x$ designates the 4, 5 or 10 position.

2. A perylene-quinone derivative of the general formula:

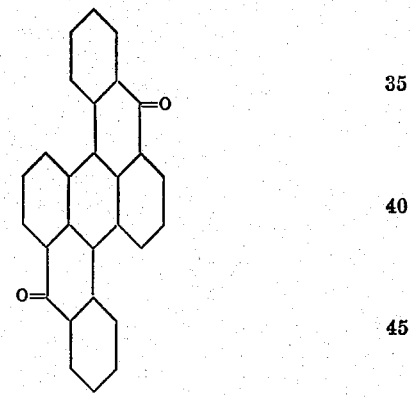

said derivative being substantially identical with the compound obtainable by ring closing a 1,5-diaroyl-anthracene.

3. Dibenz-perylene-quinone, being substantially identical with the compound obtainable by ring closing 1,5-dibenzoyl-anthracene.

4. The process of producing a ketonic compound of the anthracene series, which comprises fusing with aluminum chloride an alpha-aroyl-anthracene selected from the group consisting of alpha-mono-aroyl-anthracene and $x$, 1-diaroyl-anthracene, wherein $x$ designates the 4, 5 or 10 position in the anthracene molecule.

5. A process as in claim 4, the fusion being carried out in the presence of an oxidizing agent.

6. The process of producing a ketonic compound of the anthracene series, which comprises fusing with aluminum chloride $x$, 1-diaroyl-anthracene, wherein $x$ designates the 4, 5 or 10 position in the anthracene molecule.

7. A process as in claim 6, the fusion being carried out in the presence of an oxidizing agent.

8. The process of producing a ketonic compound of the anthracene series, which comprises fusing with aluminum chloride a 1,5-diaroyl-anthracene.

9. A process as in claim 8, the fusion being carried out in the presence of an oxidizing agent selected from the group comprising manganese dioxide, oxygen and air.

10. A process as in claim 8, the fusion being carried out in the presence of manganese dioxide.

11. The process of producing a ketonic compound of the anthracene series, which comprises fusing with aluminum chloride 1,5-dibenzoyl-anthracene.

12. The process of producing a ketonic compound of the anthracene series, which comprises fusing with aluminum chloride, in the presence of manganese dioxide, 1,5-dibenzoyl-anthracene, hydrolyzing the intermediate organic aluminum chloride complex thus formed by the aid of dilute aqueous hydrochloric acid, destroying the excess of manganese dioxide, and recovering the precipitated organic compound.

13. An intermediate for dyestuffs having the general formula:

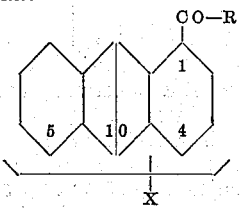

wherein R stands for an aryl radical while X stands for hydrogen or another aroyl radical in the 4, 5 or 10 position.

14. An $x$, $\alpha$-diaroyl-anthracene, wherein $x$ stands for one of the positions 4, 5 and 10.

15. 1,5-diaroyl-anthracene.

16. 1,5-dibenzoyl-anthracene.

17. The process of producing an aroyl-anthracene compound, which comprises reacting an anthracene-carbonyl-halide with an aromatic hydrocarbon in the presence of a metal halide condensing agent.

18. The process of producing a diaroyl-anthracene compound which comprises reacting an anthracene-dicarbonyl-chloride with an excess of aromatic hydrocarbon in the presence of a metallic chloride condensing agent.

19. The process of producing a 1,5-diaroyl-anthracene, which comprises reacting 1,5-anthracene-dicarbonyl-chloride with an excess of an aromatic hydrocarbon in the presence of aluminum chloride.

20. The process of producing 1,5-dibenzoyl-anthracene, which comprises reacting 1,5-anthracene-dicarbonyl-chloride with an excess of benzene in the presence of aluminum chloride.

RALPH N. LULEK.
MELVIN A. PERKINS.